US009740901B2

(12) United States Patent
Isaacs

(10) Patent No.: US 9,740,901 B2
(45) Date of Patent: Aug. 22, 2017

(54) GRAPHICAL MENU BUILDER FOR ENCODING APPLICATIONS IN AN IMAGE

(71) Applicant: Genesys Telecommunications Laboratories, Inc., Daly City, CA (US)

(72) Inventor: Charles Isaacs, San Jose, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 15/281,022

(22) Filed: Sep. 29, 2016

(65) Prior Publication Data

US 2017/0017819 A1    Jan. 19, 2017

Related U.S. Application Data

(63) Continuation of application No. 13/238,499, filed on Sep. 21, 2011, now Pat. No. 9,460,465.

(51) Int. Cl.
G06Q 30/06    (2012.01)
G06K 7/10    (2006.01)
G06K 7/14    (2006.01)

(52) U.S. Cl.
CPC ....... G06K 7/10722 (2013.01); G06K 7/1417 (2013.01); G06Q 30/0601 (2013.01); G06Q 30/0643 (2013.01)

(58) Field of Classification Search
None
See application file for complete search history.

(56) References Cited

U.S. PATENT DOCUMENTS

| 5,276,909 A | 1/1994 | Milner et al. |
| 5,995,553 A | 11/1999 | Crandall et al. |
| 6,076,733 A | 6/2000 | Wilz, Sr. et al. |
| 6,102,289 A | 8/2000 | Gabrielson |

(Continued)

FOREIGN PATENT DOCUMENTS

| CA | 2805484 A1 | 1/2012 |
| WO | 2007070188 A2 | 6/2007 |

(Continued)

OTHER PUBLICATIONS

Anonymous, "QR code," Wikipedia, Jul. 11, 2010, XP000002656991, Retrieved from the Internet: URL:https://secure.wikimedia.org/wikipedia/en/w/index.php?title=QR_code&oldid=372933104 on Oct. 22, 2012, 4 pages.

(Continued)

*Primary Examiner* — Sumati Lefkowitz
*Assistant Examiner* — Carol Wang
(74) *Attorney, Agent, or Firm* — Lewis Roca Rothgerber Christie LLP

(57) ABSTRACT

The present invention provides a method and apparatus for encoding applications in an image. One embodiment of the method includes forming a first image that encodes information indicative of a map relating one or more pixel patterns to functionality implemented by a processor-based device. The first image is formed so that the processor-based device can decode the information to generate the map. The method also includes forming a second image that includes the pixel pattern(s). The second image is formed so that the processor-based device can detect the pixel pattern(s) and implement the functionality using the map.

18 Claims, 7 Drawing Sheets

(56) References Cited

U.S. PATENT DOCUMENTS

| | | |
|---|---|---|
| 6,151,611 A | 11/2000 | Siegel |
| 6,493,447 B1 | 12/2002 | Goss et al. |
| 6,625,313 B1 | 9/2003 | Morita et al. |
| 6,961,712 B1 | 11/2005 | Perkowski |
| 6,990,453 B2 | 1/2006 | Wang et al. |
| 7,003,731 B1 | 2/2006 | Rhoads et al. |
| 7,343,330 B1 | 3/2008 | Boesjes et al. |
| 7,346,512 B2 | 3/2008 | Li-Chun Wang et al. |
| 7,359,889 B2 | 4/2008 | Wang et al. |
| 7,627,477 B2 | 12/2009 | Wang et al. |
| 7,739,062 B2 | 6/2010 | Wang |
| 7,797,204 B2 | 9/2010 | Balent |
| 7,853,664 B1 | 12/2010 | Wang et al. |
| 7,865,368 B2 | 1/2011 | Li-Chun Wang et al. |
| 7,881,657 B2 | 2/2011 | Wang et al. |
| 7,904,333 B1 | 3/2011 | Perkowski |
| 7,986,913 B2 | 7/2011 | Wang |
| 8,086,171 B2 | 12/2011 | Wang et al. |
| 8,090,579 B2 | 1/2012 | DeBusk et al. |
| 9,460,465 B2 | 10/2016 | Isaacs |
| 2001/0045461 A1 | 11/2001 | Schuessler |
| 2002/0009208 A1 | 1/2002 | Alattar et al. |
| 2003/0106039 A1 | 6/2003 | Rosnow et al. |
| 2003/0110516 A1 | 6/2003 | Chang et al. |
| 2004/0148226 A1 | 7/2004 | Shanahan |
| 2004/0267879 A1 | 12/2004 | Smith et al. |
| 2005/0008130 A1 | 1/2005 | Wakamatsu |
| 2005/0197893 A1 | 9/2005 | Landau et al. |
| 2005/0228849 A1 | 10/2005 | Zhang |
| 2005/0246422 A1 | 11/2005 | Laning |
| 2006/0065733 A1 | 3/2006 | Lee et al. |
| 2006/0070006 A1 | 3/2006 | Erol et al. |
| 2006/0095860 A1 | 5/2006 | Wada et al. |
| 2006/0167940 A1 | 7/2006 | Colton et al. |
| 2007/0198359 A1 | 8/2007 | Kannan et al. |
| 2007/0205596 A1 | 9/2007 | Mizuno et al. |
| 2008/0142599 A1 | 6/2008 | Benillouche et al. |
| 2008/0191878 A1 | 8/2008 | Abraham |
| 2008/0270884 A1 | 10/2008 | Rehm |
| 2009/0132391 A1 | 5/2009 | Jacobs |
| 2009/0307232 A1 | 12/2009 | Hall |
| 2010/0036384 A1 | 2/2010 | Gorek et al. |
| 2010/0036984 A1 | 2/2010 | Goodman et al. |
| 2010/0121681 A1 | 5/2010 | Abdulhayoglu et al. |
| 2010/0133333 A1 | 6/2010 | Rathus |
| 2010/0134278 A1 | 6/2010 | Srinivasan et al. |
| 2010/0158311 A1 | 6/2010 | Takahashi et al. |
| 2010/0211448 A1 | 8/2010 | Beenau et al. |
| 2010/0223664 A1 | 9/2010 | Naranjo et al. |
| 2010/0228963 A1 | 9/2010 | Kassab et al. |
| 2010/0274910 A1 | 10/2010 | Ghanaie-Sichanie et al. |
| 2010/0281398 A1 | 11/2010 | Melideo |
| 2011/0040610 A1 | 2/2011 | Araiza-Boys |
| 2011/0145064 A1 | 6/2011 | Anderson et al. |
| 2011/0246202 A1 | 10/2011 | McMillan et al. |
| 2011/0320277 A1 | 12/2011 | Isaacs |
| 2012/0011218 A1 | 1/2012 | Isaacs |
| 2012/0075083 A1 | 3/2012 | Isaacs |
| 2013/0071037 A1 | 3/2013 | Isaacs |

FOREIGN PATENT DOCUMENTS

| | | |
|---|---|---|
| WO | 2011163047 A1 | 12/2011 |
| WO | 2012009182 A1 | 1/2012 |

OTHER PUBLICATIONS

Australian Office action for Application No. 2011279474, dated Nov. 15, 2013, 3 pages.

Dell Contact Customer Service Support HOme Page, http://web.archive.org/web/20090320044639/http://support.dell.com/support—from www.dell.com Website Nov. 28, 2012, 1 page.

International Preliminary Report on Patentability and Written Opinion for PCT/US2011/040628, issued on Dec. 28, 2012, 5 pages.

International Search Report for PCT/US2011/040628, mailed on Sep. 1, 2011, 2 pages.

International Search Report for PCT/US2011/042989. dated Sep. 16, 2011, 4 pages.

Australian Government Patent Examination Report No. 1 for Application No. 2015213415, dated Aug. 30, 2016, 3 pages.

Canadian intellectual Property Office Action for U.S. Pat. No. 2,805,484, dated Apr. 5, 2017, 4 pages.

GRAPHICAL MENU BUILDER FOR ENCODING APPLICATIONS IN AN IMAGE

CROSS-REFERENCE TO RELATED APPLICATIONS

This application is a continuation of U.S. patent application Ser. No. 13/238,499, filed on Sep. 21, 2011, now U.S. Pat. No. 9,460,465, the disclosure of which is hereby incorporated by reference in its entirety.

BACKGROUND

This application relates generally to processor-based systems, and, more particularly, to image acquisition and processing techniques implemented in processor-based systems.

Processor-based systems that once required a roomful of electronics are now routinely implemented in handheld processor-based devices such as smart phones. For example, a smart phone may include cellular and/or wireless radios that operate according to conventional standards and/or protocols. A smart phone may also include processors, memories, multi-touch screens, cameras, Global Positioning System (GPS) functionality, 3-axis gyros, accelerometers, light sensors, and other functionality. The functionality of the smart phone can be used to create software applications that are conventionally referred to as "apps".

Customers and retailers have found that smart phones can facilitate communication about particular products before, during, and after purchase. Smart phones can therefore enhance the customer experience and help retailers to increase sales. For example, retailers can advertise their products and provide customer service before, during, and after purchase of the product. However, easy access to online product information via smart phones may cause brick-and-mortar retailers to lose customers. For example, a customer may come into a store to "kick the tires" of a product such as a television before deciding whether to purchase the television. The customer may also use their smart phone to do online product research and/or price research, e.g. using one-dimensional bar codes and/or two-dimensional quick response (QR) codes that identify the product. If the price research reveals a lower price, the customer may decide to purchase the television at a different store or online. The retailer may therefore lose the sale even though the retailer provided the in-store experience that convinced the customer to purchase the television.

Retailers can combat the tendency of customers to leave the store in search of lower prices by providing enhanced customer service, which may be facilitated by communication via smart phones. However, brick-and-mortar retailers may not be able to exploit all the capabilities of these devices because communication between the retailer and a customer may be disrupted if the customer's smart phone loses access to the cellular communication system when the customer enters a building. In this situation, customers can only gather the information encoded in one-dimensional barcodes and/or two-dimensional QR codes.

SUMMARY

Generally, the present application describes embodiments of techniques that allow users of processor-based devices, such as wireless-enabled handheld devices or smart phones, to gather information encoded in an image. One-dimensional bar codes and/or two-dimensional quick response (QR) codes are the conventional standardized formats for encoding characters in an image. For example, a camera in a handheld device can be used to scan a QR code that can then be parsed using a code reader that operates according to the predetermined standards. The QR code can include pricing information, product specifications, information that directs the user to a website, information that can be used to contact a customer service representative, and the like. However, the standardized QR code image must conform to the predetermined standard and must only include black and white squares arranged according to the standard. For example, a QR code includes version information in a predetermined location within the QR code, format information, three sets of nested squares to define the position of the QR code, another set of nested squares to determine alignment, and a set of squares to define the timing for the QR code. The remaining area within the QR code can then be used to convey data such as numbers and/or characters using patterns defined by the standard. Although standardizing QR codes allows them to be read by any code reader that is implemented according to the standard, this results in a number of drawbacks. For example, QR codes may appear ugly or intrusive when attached to products and standard QR codes cannot be used to visually identify or brand the company or product. For another example, the amount of information that can be encoded in a QR code may be limited. These drawbacks may reduce the ability of retailers to retain customers by providing information and/or personal service inside the store.

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for encoding applications in an image. One embodiment of the method includes forming a first image that encodes information indicative of a map relating one or more pixel patterns to functionality implemented by a processor-based device. The first image is formed so that the processor-based device can decode the information to generate the map. The method also includes forming a second image that includes the pixel pattern(s). The second image is formed so that the processor-based device can detect the pixel pattern(s) and implement the functionality using the map.

In another embodiment, a method is provided for decoding applications that are encoded in an image. One embodiment of the method includes decoding, using a processor-based device, a first representation of a first image that encodes information indicative of a map relating one or more pixel patterns to functionality implemented by the processor-based device. Embodiments of the method also include implementing, in the processor-based device, the functionality in response to detecting the pixel pattern(s) in a second representation of a second image using the map.

In yet another embodiment, a computer readable media is provided that includes instructions that when executed can configure a processor-based device to perform a method for decoding applications that are encoded in an image. Embodiments of the computer readable media include instructions for decoding a first representation of a first image that encodes information indicative of a map relating one or more pixel patterns to functionality implemented by the processor-based device. Embodiments of the computer readable media also include instructions for implementing, in the processor-based device, the functionality in response to detecting the pixel pattern(s) in a second representation of a second image using the map.

In a further embodiment, a visual presentation is provided. One embodiment of the visual presentation includes a first image that encodes information indicative of a map relating one or more pixel patterns to functionality implemented by a processor-based device. The first image is formed so that the processor-based device can decode the information to generate the map. The visual presentation also includes a second image that includes one or more pixel patterns. The second image is formed so that the processor-based device can detect the pixel pattern(s) and implement the functionality using the map.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
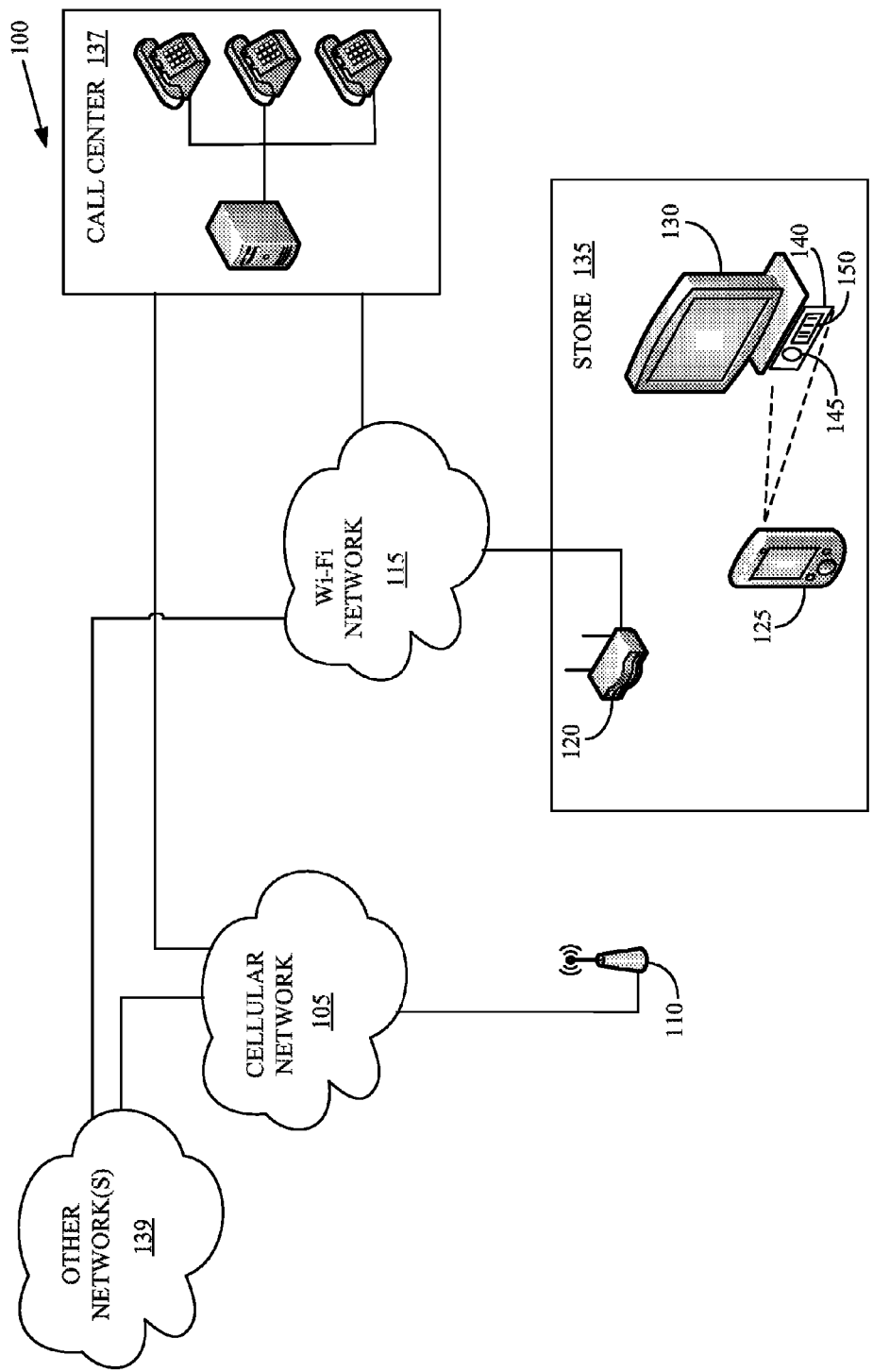
FIG. 1 conceptually illustrates one exemplary embodiment of a communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments of the techniques described herein may address drawbacks in conventional barcodes or QR codes by including an image that represents a "dictionary" or "map" that defines relationships between pixel patterns that may be found in the image and functionality of the processor-based device. For example, the image, which may be colloquially referred to as a "decoder ring" image, can cross reference a plurality of pixel patterns and a corresponding plurality of functions that are implemented by the processor-based device. The image representing the pixel cross-reference map may be included in a visual presentation that also includes some or all the pixel patterns defined by the map, so that the visual presentation encodes functionality of the device. The decoder ring image can be read using a camera installed in the device and the representation generated by the camera can be analyzed/decoded using image processing functionality to generate a map of the relationships between different pixel patterns and the device functionality. The decoder ring image may also include information that identifies pixel patterns used to convey version information, format information, data and/or error correction keys, as well as patterns used to establish position, alignment, and/or timing for the encoded image. The map generated from the decoded image can then be used to detect one or more of the pixel patterns in another image, which may be part of the same display or visual presentation as the decoder ring image. The pixel patterns can be defined by numbers of pixels, shapes of groups of pixels, pixel colors, pixel shading, and/or combinations thereof. Pixel patterns can also be used to define numbers, characters, and/or other data that may be input to the functions of the device. The map can be defined using a computer language that is implemented in the device using an app that may be provided by developer, a retailer, a vendor, and the like.

FIG. 1 conceptually illustrates one exemplary embodiment of a communication system 100. In the illustrated embodiment, the communication system 100 includes a cellular network 105 that can provide wireless connectivity using one or more base stations 110. The cellular network 105 may operate according to any suitable wireless communication standards and/or protocols, such as Global System for Mobile communications (GSM) standards and/or protocols, code division multiple access (CDMA) standards and/or protocols, or other standards and/or protocols defined by the Third Generation Partnership Project (3GPP). However, persons of ordinary skill in the art having benefit of the present disclosure should appreciate that other embodiments of cellular networks may operate according to other standards and/or protocols. The illustrated embodiment of the communication system 100 also includes a Wi-Fi network 115 that can provide wireless connectivity using one or more access points 120. The Wi-Fi network 115 may operate according to standards and/or protocols such as the various IEEE 802 standards and/or protocols. However, persons of ordinary skill in the art having benefit of the present disclosure should appreciate that other embodiments of Wi-Fi networks may operate according to other standards and/or protocols.

The communication system 100 may support wireless communication with one or more processor-based devices such as wireless-enabled handheld devices or smartphones 125. In the illustrated embodiment, the smartphone 125 implements functionality such as radios that support wireless communication. For example, the smart phone 125 may include cellular and/or wireless radios that operate according to Global System for Mobile communications (GSM) standards and/or protocols, code division multiple access (CDMA) standards and/or protocols, various IEEE 802 wireless standards and/or protocols, Bluetooth standards and/or protocols, and the like. The smartphone 125 also includes other functionality such as processors, memories, multi-touch screens, digital cameras, Global Positioning System (GPS) functionality, 3-axis gyros, accelerometers, light sensors, and other functionality. The functionality of the smartphone 125 can be configured to perform different tasks using software applications, which may be referred to hereinafter as "apps" in accordance with conventional use in the art.

Embodiments of the smartphone 125 may be configured to gather information regarding products such as a television 130 and to facilitate communication with retailers selling the products. In the illustrated embodiment, a user has brought the smartphone 125 into a store 135 during a visit to research the possible purchase of the television 130. The retailer is interested in providing optimal customer service and as much information as possible to convince the user to purchase the television 130 from the store 135. In one embodiment, the retailer may want to provide information such as specifications for the product 130, the price of the product 130, availability of the product 130, upgrades or service contracts that can be purchased with the product 130, accessories, and the like. In other embodiments, the retailer may want to allow the user to summon a clerk to discuss the product 130, connect the user to a customer service call center 137, connect the user to other networks 139 such as a relevant social network, and the like.

The retailer may therefore provide a visual presentation 140 that encodes information that can be decoded using a pixel reader app installed on the smartphone 125. In the illustrated embodiment, the visual presentation 140 includes a pixel cross reference image 145 that encodes a map that cross-references one or more pixel patterns to functionality implemented in the smartphone 125. For example, the pixel cross reference image 145 may use a predetermined pixel language that is known to the pixel reader app and can be used to encode the mapping of the pixel patterns to the smartphone functionality. The visual presentation 140 also includes one or more other images 150 that use the pixel patterns defined by the pixel cross reference image 145 to encode combinations of smartphone functionality and possibly other configuration information that can be used to configure apps in the smartphone 125. In various embodiments, the visual presentation 140 may be associated with the product 130 by positioning a piece of paper, a label, an adhesive sticker, a sign, a brochure, other published materials, or other display including the visual presentation 140 near or on the product 130. Alternatively, for products such as televisions 130 that include display devices or screens, the visual presentation 140 may be presented by the product, e.g., by displaying the visual presentation 140 on a screen that is built into the product 130.

Figure 2:
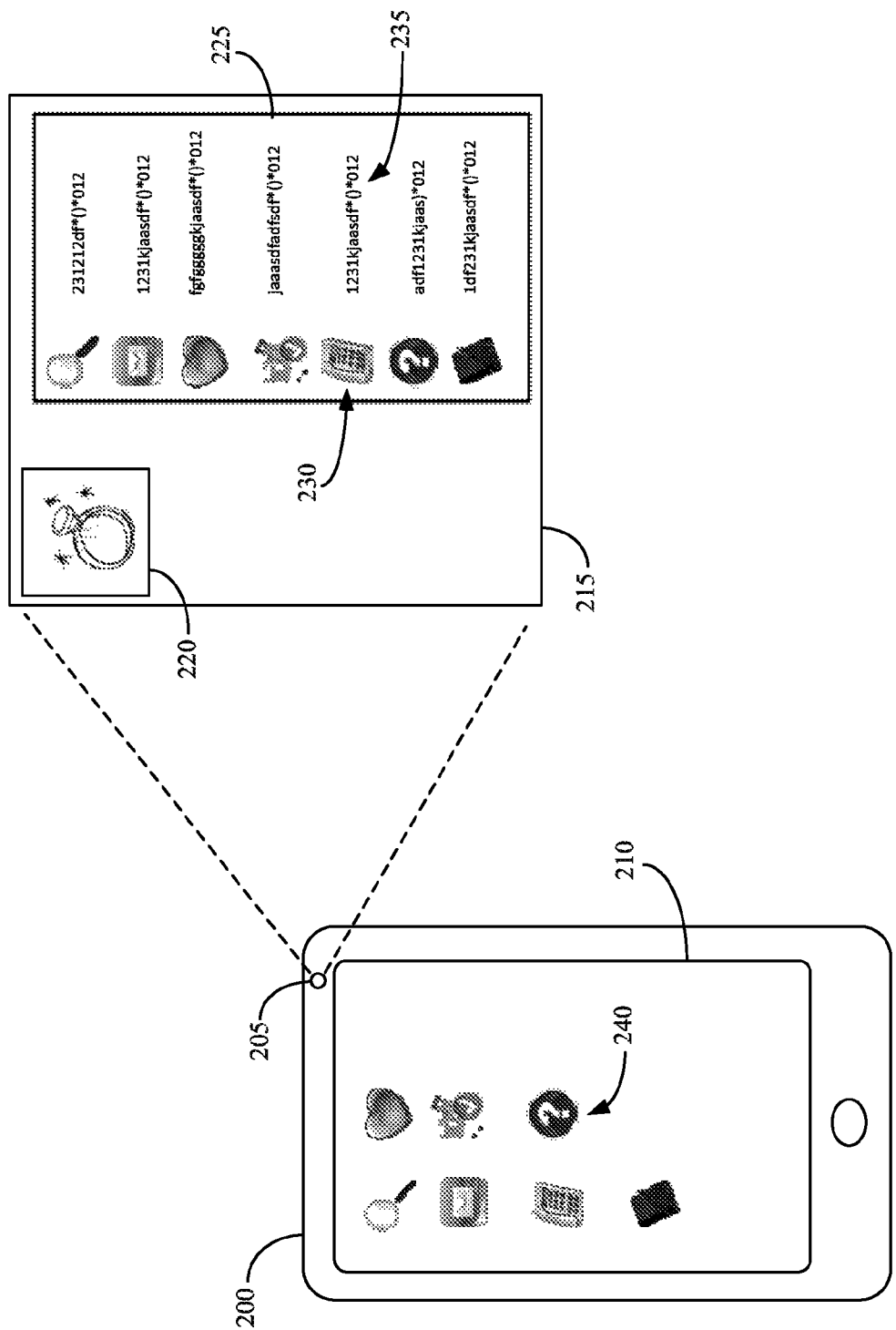
FIG. 2 conceptually illustrates one exemplary embodiment of a processor device such as a smartphone.

FIG. 2 conceptually illustrates one exemplary embodiment of a processor device such as a smartphone 200. In the illustrated embodiment, the smartphone 200 includes image acquisition functionality such as a camera 205 that includes conventional optical elements for acquiring images and conventional circuitry for converting the acquired images into a digital representation of the image. Techniques for implementing and operating image acquisition functionality are known in the art and in the interest of clarity only those aspects of implementing and operating image acquisition functionality that are relevant to the claimed subject matter are discussed in detail herein. The illustrated embodiment of the smartphone 200 also includes a multi-touch screen 210 for displaying images and allowing a user to interact with the display. Techniques for implementing and operating touchscreens and multi-touch screens are known in the art and in the interest of clarity only those aspects of implementing and operating the touchscreen 210 that are relevant to the claimed subject matter are discussed in detail herein.

The smartphone 200 may be configured to acquire images that encode functionality of the smartphone 200. In the illustrated embodiment, the camera 205 may be used to acquire a digital representation of a visual presentation 215 that includes a pixel cross reference image 220 (shown here as a "decoder ring" image) that encodes a map that cross-references one or more pixel patterns to functionality that may be implemented in the smartphone 200. The visual presentation 215 also includes an image 225 that may include combinations of the pixel patterns identified in the map 220. The pixel patterns in the image 225 may therefore be used to encode functionality that can be used to configure functions implemented in the smartphone 200, e.g., the pixel patterns in the image 225 may encode apps that can be used by the smartphone 200. For example, the decoder ring image 220 may cross reference the image of a magnifying glass to Internet search functionality implemented in the smart phone 200, the image of an envelope to e-mail functionality, the image of a shopping cart to functionality for purchasing items, the image of a phone to cell phone functionality, the image of a "?" to functionality for summoning a store clerk to the location of the cell phone, and the like.

The smartphone 200 can use the decoder ring image 220 to create a pixel cross-reference map that can then be used to identify pixel patterns in the image 225, decode the pixel patterns, and then configure the associated functionality of the smartphone 200. In the illustrated embodiment, the image 225 includes various pixel patterns 230 that identify or encode different functions that may be implemented in the smartphone 200. The image 225 may also include characters or other symbols 235 that may include information used to configure the functions associated with the pixel patterns 230. For example, the symbols 235 may include an e-mail address used to configure the e-mail functionality associated with the envelope symbol to send an e-mail to a particular address. For another example, the symbols 235 may include a phone number that may be used to configure the cell phone functionality to call a particular number, such as the number of a call center. In one embodiment, the symbols 235 may be extracted from the image 225 using optical character recognition or other techniques. Coloring and/or shading may in some cases be used to obscure or hide the symbols 235 so that users may not be able to see the symbols 235 and yet the symbols 235 may still be extracted from the image 225 using the image processing functionality.

Once the smartphone 200 has decoded the information in the image 225 and configured the functionality represented in the patterns 230 and/or symbols 235, the smartphone 200 may compile the functionality and generate machine instructions for executing the configured apps. The app may be executed in response to being compiled or the machine instructions may be stored for later execution. The smartphone 200 may also display icons 240 that can be used to activate or execute the apps, e.g., when a user taps the icon 240.

Figure 3:
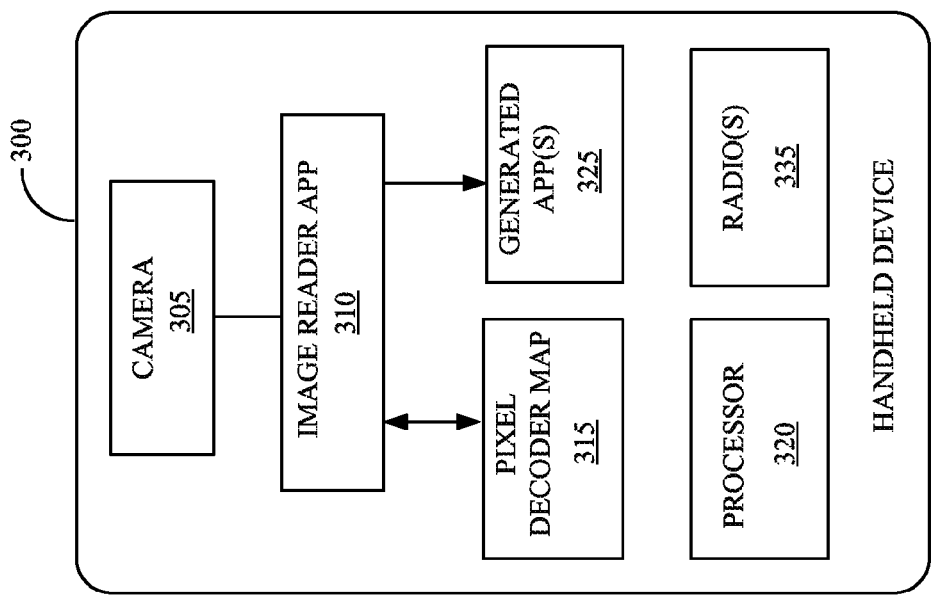
FIG. 3 conceptually illustrates one exemplary embodiment of a handheld device.

FIG. 3 conceptually illustrates one exemplary embodiment of a handheld device 300. In the illustrated embodiment, the handheld device 300 implements a camera 305 that includes optics and/or circuitry used to acquire external images and generate a digital output signal representative of the acquired image. The digital output signal can be provided to an image reader application 310 that can apply image detection, pattern recognition, character recognition, and/or other algorithms to detect and/or identify patterns of pixels in the digital output signal representative of the acquired image. The patterns of pixels may be identified based on the number of pixels, the absolute positions or relative positions of the pixels, colors of the pixels, shading or transparency of the pixels, or other characteristics of the pixels or combinations of pixels. In the illustrated embodiment, the image reader app 310 is configured to identify and decode an image that includes information indicating a pixel-pattern-to-function cross-reference map 315, which may also be referred to as a pixel decoder map, a decoder ring, and the like. The decoded information can then be stored in memory in the handheld device 300 as a pixel decoder map 315.

Figure 4:
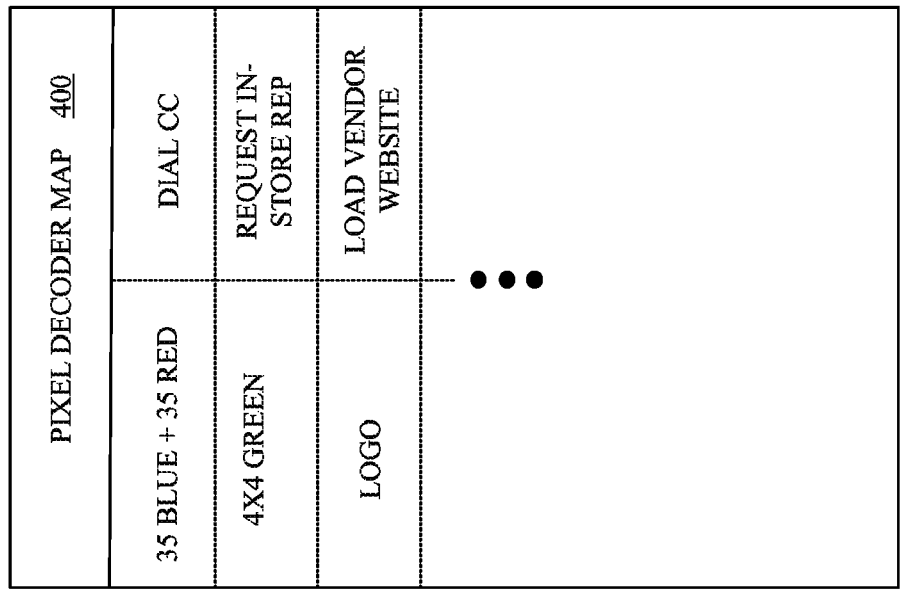
FIG. 4 conceptually illustrates one exemplary embodiment of a pixel decoder map.

FIG. 4 conceptually illustrates one exemplary embodiment of a pixel decoder map 400. In the illustrated embodiment, the left-hand column includes information indicating a pixel pattern and the right-hand column includes information indicating the functionality associated with the corresponding pixel pattern. For example, the pixel decoder map 400 indicates that a pattern of 35 blue pixels followed by 35 red pixels encodes cellular phone functionality that is configured to dial a call center (CC), e.g., so that a user can speak to an operator regarding some item or product. For another example, the pixel decoder map 400 indicates that a 4×4 pattern of green pixels encodes functionality that can be used to request an in-store representative. This functionality may include functionality for accessing a Wi-Fi system implemented in the store to send a message requesting a representative that is familiar with the associated product. The message may also indicate the precise location of the user (e.g., using global positioning system functionality of the smartphone) and the functionality may allow the representative to track the user in case the user moves away from the initial location. For yet another example, the pixel decoder map 400 may indicate that a logo may encode functionality that automatically loads the vendor website associated with the logo.

Referring back to FIG. 3, the image reader app 310 may use the information stored in the pixel decoder map 315 to decode additional images acquired by the camera 305. In one embodiment, the image reader app 310 may identify one or more pixel patterns in the acquired image that correspond to pixel patterns identified in the pixel decoder map 315. For example, the image reader app 310 may identify a series of 35 blue pixels followed by 35 red pixels, a 4×4 pattern of green pixels, a vendor logo, or other pixel pattern identified in the pixel decoder map 315. The image reader app 310 may then provide a signal indicating that the device 300 should configure one or more apps corresponding to the pixel patterns in the acquired image. For example, the image reader app 310 may provide signals indicating the functionality and any other configuration information encoded in the acquired image to one or more processor elements 320 so that the functionality can be configured and are compiled to generate one or more apps. The generated apps 325 can then be stored for subsequent execution. In the illustrated embodiment, the handheld device 300 is a wireless-enabled handheld device that can use one or more radios 330 to communicate with other networks such as cellular networks and/or Wi-Fi networks.

Figure 5A:
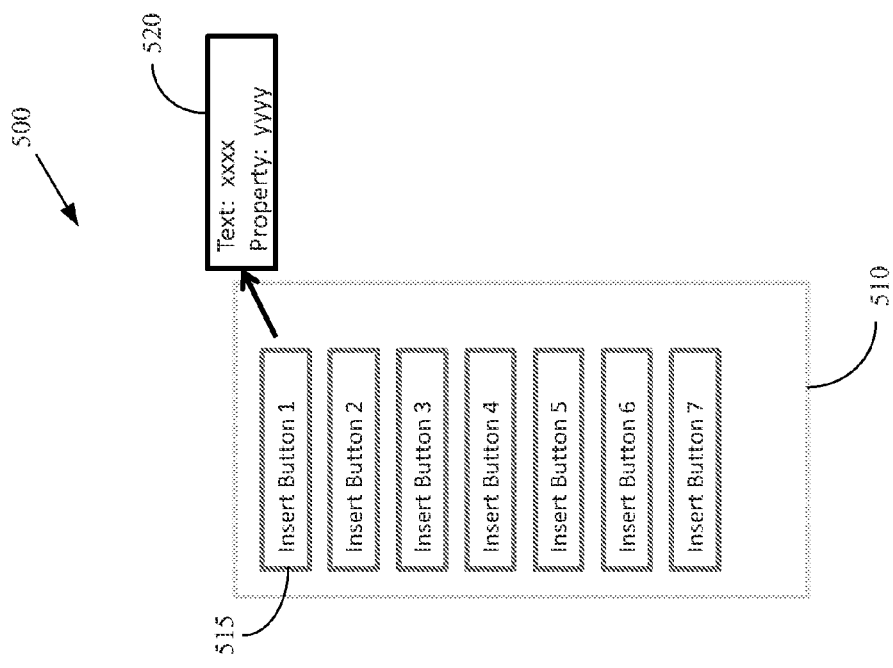
FIGS. 5A-5C conceptually illustrate one exemplary embodiment of a graphical menu building technique that can be used to create visual presentations that encode functionality of processor devices.
Figure 5A:
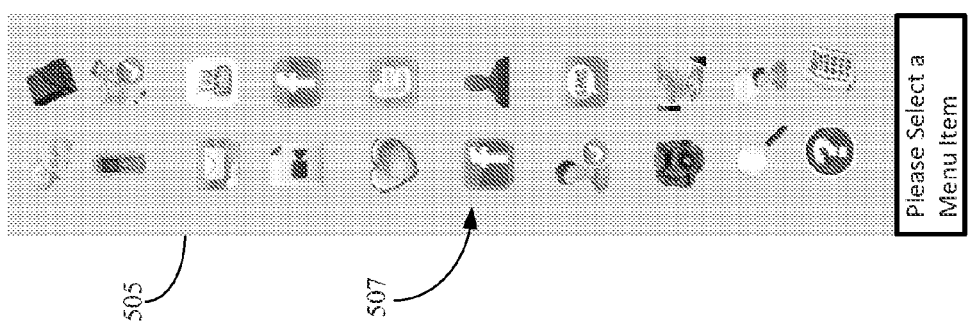
Figure 5B:
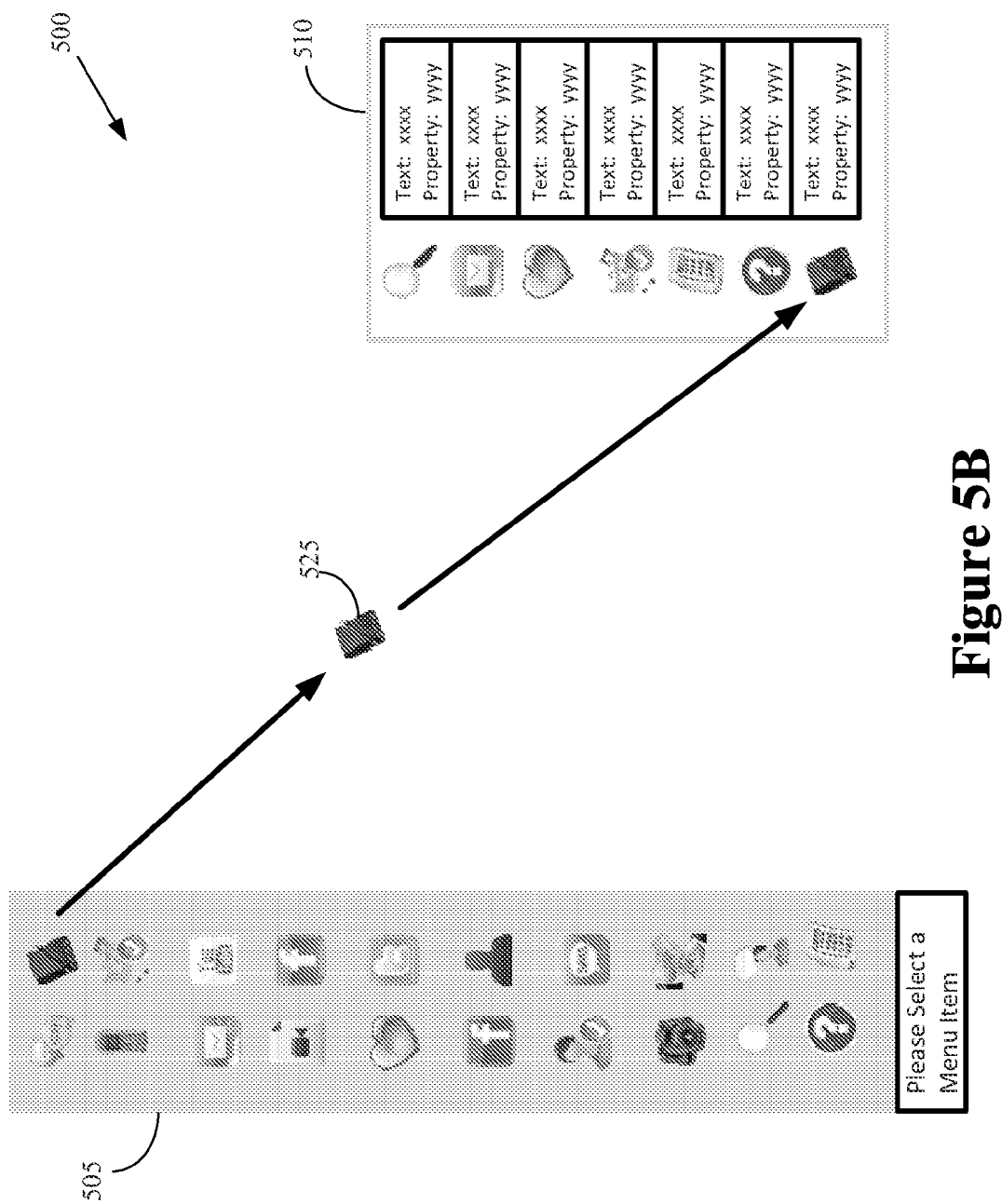
Figure 5C:
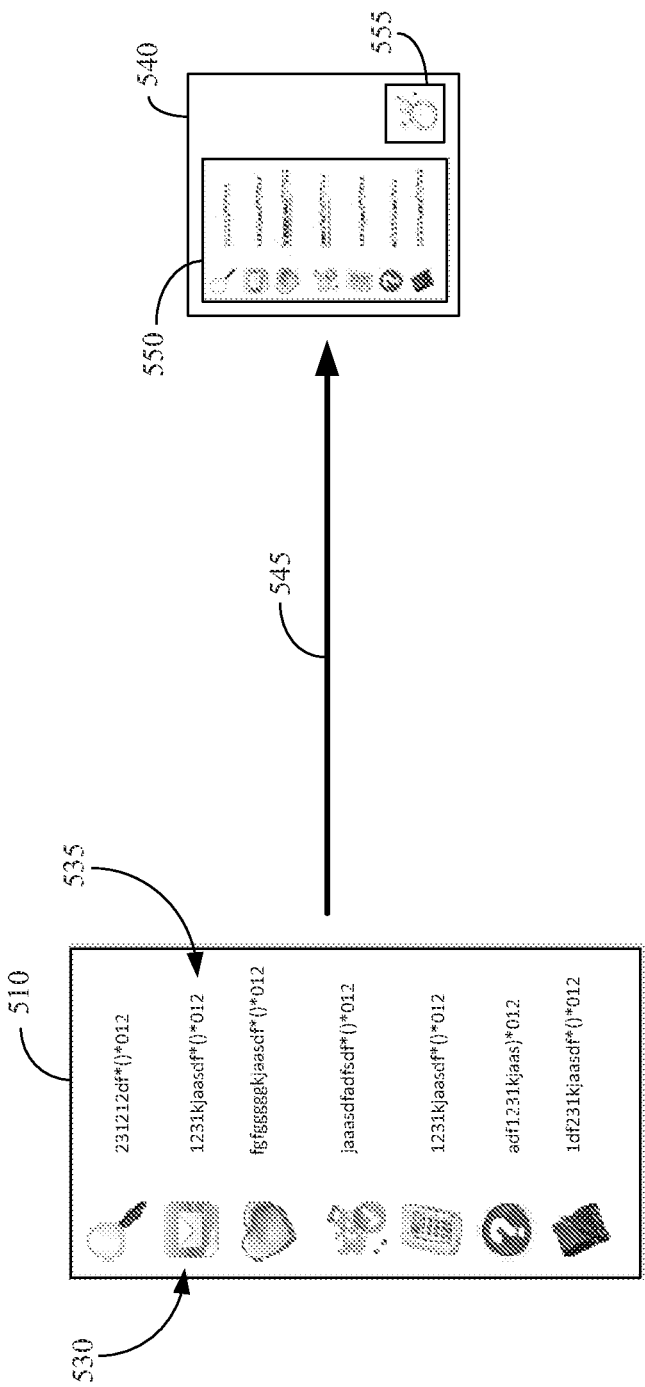

FIGS. 5A, 5B, and 5C conceptually illustrate one exemplary embodiment of a graphical menu building technique that can be used to create visual presentations that encode functionality of processor devices. In the illustrated embodiment, the graphical menu builder 500 shown in FIG. 5A presents a menu 505 of functionality that can be incorporated or encoded into a visual presentation. The graphical menu builder 500 may be implemented and/or executed on a processing device and the menu 505 may be presented on a display connected to or otherwise associated with the processing device. For example, icons 507 corresponding to functionality that may be implemented in a processor device such as a smart phone can be presented in the menu 505. The graphical menu builder 500 may also present a template 510 that illustrates where the images that encode different functions can be positioned within the visual presentation. For example, the template 510 includes various boxes 515 that show where buttons can be inserted. Each button location may also include template entries 520 for text, properties, or other configuration information related to the functionality that may be encoded at the button location.

FIG. 5B conceptually illustrates how a user can use drag-and-drop techniques to select an icon 525 from the menu 505, "drag" the icon 525, and then "drop" the icon 525 into a location in the template 510. Drag-and-drop techniques are known in the art and in the interest of clarity only those aspects of these techniques that are relevant to the claimed subject matter are described in detail herein. Furthermore, persons of ordinary skill in the art having benefit of the present disclosure should appreciate that other graphical user interface techniques may be used to populate fields in the template 510 based on the icons presented in the menu 505. For example, if the menu 505 is presented using a touchscreen or a multi-touch screen, then users can populate fields in the template 510 by touching the appropriate portion of the screen and dragging their finger to the appropriate location in the template 510. Textual information, properties of the functionality indicated by the icon 525, and the like may also be entered into the appropriate position in the template 510.

In FIG. 5C, the template 510 has been populated with icons 530 representing functionality that may be implemented in processor devices such as smart phones. The illustrated embodiment of the template 510 also includes configuration information 535 that can be used to configure the functionality represented by the icons 530. The template 510 can be used to generate a visual presentation 540, as indicated by the arrow 545. In the illustrated embodiment, generating the visual presentation 540 includes generating an image 550 that includes pixel patterns representative of the icons 530 and pixel patterns that represent the configuration information 535. Generating the visual presentation 540 also includes generating a decoder ring image 555 that encodes a pixel cross-reference map that can be used to decode the pixel patterns in the image 550. The visual presentation 540 may be generated in any desirable format. For example, a printer may be used to print the visual presentation 540 on a piece of paper, a poster, a decal, a price tag, and the like. For another example, the visual presentation 540 may be stored in a digital form that can be used to display the visual presentation on a display, a screen, using a projection system, and the like.

Figure 6:
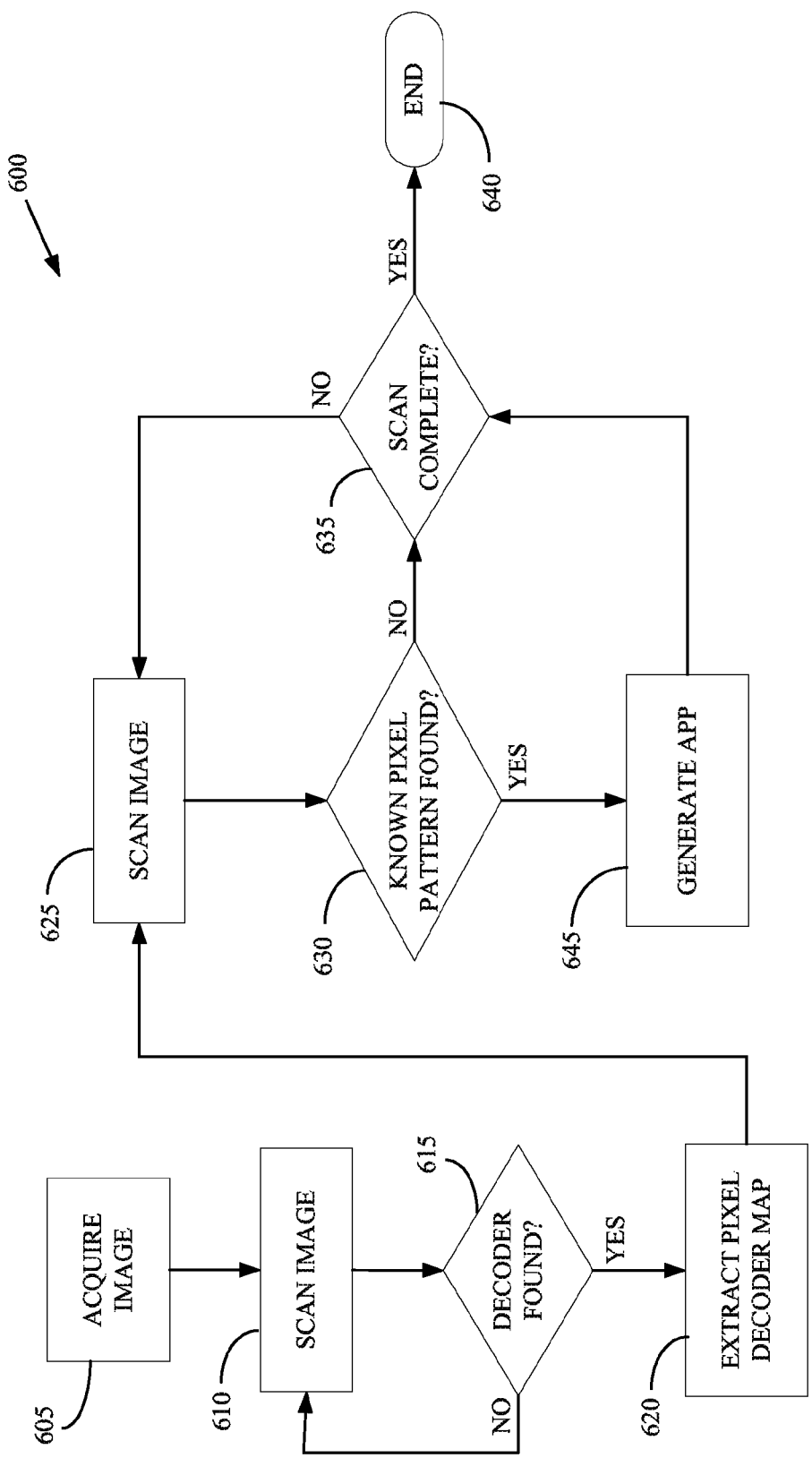
FIG. 6 conceptually illustrates one exemplary embodiment of a method for configuring a processor device using information encoded in an acquired image.

FIG. 6 conceptually illustrates one exemplary embodiment of a method 600 for configuring a processor device using information encoded in an acquired image. In the illustrated embodiment, the processor device uses image acquisition technology such as a camera and associated optics, software, firmware, and/or hardware to acquire (at 605) an image from a visual presentation. The processor device can scan (at 610) through a digital representation of the image and attempt (at 615) to identify a portion of the image that includes a pixel decoder image. In various embodiments, different pattern recognition techniques may be used to identify the portion of the image that includes the pixel decoder image. The processor device continues the scan (at 610) as long as the processor device has not yet identified (at 615) a portion of the image including a pixel decoder image. If the processor device identifies (at 615) a pixel decoder image, then the processor device can extract (at 620) or decode the pixel decoder map, which may then be stored by the processor device for later use decoding other portions of the image in the visual presentation.

The processor device may also scan (at 625) the image to identify pixel patterns that correspond to patterns identified in the cross-reference or decoder map defined in the pixel decoder portion of the image. The scan may continue (at 625) until a known pixel pattern is found (at 630) in the image and/or the scan has completed (at 635) searching through all of the pixels in the acquired image. The scan ends (at 640) when all the pixels have been searched. Each time a known pixel pattern is found (at 630) the processor device can decode the known pixel pattern to identify the corresponding functionality of the processor device. The processor device may also extract configuration information that can be used to configure the corresponding functionality indicated by the known pixel pattern. The processor device then generates (at 645) the functionality or app using the functionality and/or configuration information. Each image may encode one or more apps using pixel patterns or combinations of pixel patterns to define the app.

Embodiments of the techniques described in the present application may be used to drag-and-drop menu items to build handheld applications. As the menu is being built, a picture is generated that includes code, buttons, functions, configuration information, and the like encoded into data that is pixelated into a picture. The generated picture may be stored on a server and used to generate a visual presentation that can be scanned, e.g., using a processor device such as a smart phone. The scanned presentation can then be used to generate the menu and the corresponding function on the processor device. The flexibility provided by encoding the pixel cross-reference map into the image allows almost any image to be used to encode any functionality supported by the device. This has a number of advantages, including allowing the image to be customized for aesthetic and/or branding purposes and allowing significantly more data to be encoded within the picture, relative to the amount of data that can be stored using conventional barcodes or QR codes. For example, given sufficient resolution in the camera and the visual presentation, each pixel could encode multiple bits of information using the pixel color, shading, location, and the like.

Alternative embodiments may also be used to customize products or services purchased by consumers. For example, retailers that sell greeting cards may allow customers to customize their own cards in the stores. In one embodiment, a customer could add a visual presentation to the card that can encode functionality to turn the card into a "living" card. For example, a visual presentation on the card may encode functionality that can be used to implement apps that present videos of the family's latest home movie, an app to initiate a phone call to a loved one using a personalized ring tone, an app configured to set up a lunch appointment, a link to a gift card, and the like. Other alternative embodiments may be used to tag documentation with images that encode apps that can connect readers with additional information such as videos, technical documentation, and the like.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method for generating a visual presentation encoding a functionality of a processor-based device in a visual medium, the method comprising:
   presenting, by a processor on a display device coupled to the processor, a menu comprising a pixel pattern representing the functionality of the processor-based device;
   presenting, by the processor on the display device, a template configured to receive the pixel pattern;
   receiving, by the processor, user instructions for inserting the pixel pattern into the template;
   encoding, by the processor, a map comprising first information for determining a correspondence between characteristics of pixels in the pixel pattern and the functionality of the processor-based device;
   generating, by the processor, a first image comprising the encoded map, the first image being decodable by the processor-based device;
   generating, by the processor, a second image based on the template and comprising the pixel pattern, the pixel pattern comprising second information for configuring the functionality of the processor-based device; and
   generating, by the processor, the visual presentation comprising the first and second images,
   wherein the functionality of the processor-based device is identified by cross-referencing the pixel pattern according to the encoded map, and the functionality of the processor-based device is configured based on the second information.

2. The method of claim 1, wherein the generating of the visual presentation comprises forming a function-encoded visual medium comprising the first image and the second image, the first image being adjacent to the second image, and
   wherein the function-encoded visual medium is acquirable by a camera implemented in the processor-based device.

3. The method of claim 2, wherein the function-encoded visual medium comprises at least one of a label, a sign, an adhesive sticker, a piece of paper, a brochure, or published materials.

4. The method of claim 1, wherein the pixel pattern comprises at least one of a number of the pixels, position of the pixels, colors of the pixels, a pixel shading value, or a shape.

5. The method of claim 4, wherein the characteristics include at least one of the number of the pixels, the position of the pixels, the colors of the pixels, the pixel shading value, or the shape.

6. The method of claim 4, wherein generating the second image comprises:
   embedding at least one of the number of the pixels, the position of the pixels, the colors of the pixels, the pixel shading value, or the shape into the second image.

7. The method of claim 6, wherein generating the second image further comprises:
   embedding at least one of a character or a number into the second image,
   wherein the encoded map associates a position of the at least one of the character or the number with the functionality of the processor-based device.

8. The method of claim 1, wherein the functionality of the processor-based device includes invoking a communication with a contact center according to the configuration based on the second information.

9. The method of claim 8, wherein the communication includes an internet search, an email, or a phone call.

10. A device for generating a visual presentation encoding a functionality of a processor-based device in a visual medium, the device comprising:
    a processor; and
    a memory, wherein the memory has stored thereon instructions that, when executed by the processor, cause the processor to:
    present on a display device coupled to the processor, a menu comprising a pixel pattern representing the functionality of the processor-based device;
    present on the display device, a template configured to receive the pixel pattern;
    receive user instructions for inserting the pixel pattern into the template;
    encode a map comprising first information for determining a correspondence between characteristics of pixels in the pixel pattern and the functionality of the processor-based device;
    generate a first image comprising the encoded map, the first image being decodable by the processor-based device;
    generate a second image based on the template and comprising the pixel pattern, the pixel pattern comprising second information for configuring the functionality of the processor-based device; and
    generate the visual presentation comprising the first and second images,
    wherein the functionality of the processor-based device is identified by cross-referencing the pixel pattern according to the encoded map, and the functionality of the processor-based device is configured based on the second information.

11. The device of claim 10, wherein the generating of the visual presentation comprises forming a function-encoded visual medium comprising the first image and the second image, the first image being adjacent to the second image, and
    wherein the function-encoded visual medium is acquirable by a camera implemented in the processor-based device.

12. The device of claim 11, wherein the function-encoded visual medium comprises at least one of a label, a sign, an adhesive sticker, a piece of paper, a brochure, or published materials.

13. The device of claim 10, wherein the pixel pattern comprises at least one of a number of the pixels, position of the pixels, colors of the pixels, a pixel shading value, or a shape.

14. The device of claim 13, wherein the characteristics include at least one of the number of the pixels, the position of the pixels, the colors of the pixels, the pixel shading value, or the shape.

15. The device of claim 13, wherein generating the second image comprises:
    embedding at least one of the number of the pixels, the position of the pixels, the colors of the pixels, the pixel shading value, or the shape into the second image.

16. The device of claim 15, wherein generating the second image further comprises:
    embedding at least one of a character or a number into the second image, wherein the encoded map associates a position of the at least one of the character or the number with the functionality of the processor-based device.

17. The device of claim 10, wherein the functionality of the processor-based device includes invoking a communication with a contact center according to the configuration based on the second information.

18. The device of claim 17, wherein the communication includes an internet search, an email, or a phone call.

* * * * *